US011416755B2

(12) United States Patent
Ramnani et al.

(10) Patent No.: US 11,416,755 B2
(45) Date of Patent: Aug. 16, 2022

(54) ARTIFICIAL INTELLIGENCE BASED SYSTEM AND METHOD FOR CONTROLLING VIRTUAL AGENT TASK FLOW

(71) Applicant: Accenture Global Solutions Limited, Dublin (IE)

(72) Inventors: Roshni Ramesh Ramnani, Bangalore (IN); Shubhashis Sengupta, Bangalore (IN); Moushumi Mahato, Jamshedpur (IN); Sukanti Beer, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 257 days.

(21) Appl. No.: 16/557,237

(22) Filed: Aug. 30, 2019

(65) Prior Publication Data

US 2021/0065017 A1    Mar. 4, 2021

(51) Int. Cl.
*G06N 5/02* (2006.01)
*G06N 5/04* (2006.01)
*H04L 51/02* (2022.01)
*G10L 15/06* (2013.01)
*G10L 15/183* (2013.01)

(52) U.S. Cl.
CPC .............. *G06N 5/025* (2013.01); *G06N 5/04* (2013.01); *G10L 15/063* (2013.01); *G10L 15/183* (2013.01); *H04L 51/02* (2013.01); *G10L 2015/0636* (2013.01)

(58) Field of Classification Search
CPC ........... G06N 5/025; G06N 5/04; H04L 51/02
See application file for complete search history.

(56) References Cited

U.S. PATENT DOCUMENTS

| | | | | |
|---|---|---|---|---|
| 10,222,942 | B1 * | 3/2019 | Zeiler | G06N 3/0427 |
| 2003/0225719 | A1 * | 12/2003 | Juang | G10L 17/04 |
| | | | | 706/48 |
| 2016/0350383 | A1 * | 12/2016 | Lim | G06F 16/24575 |
| 2017/0032138 | A1 * | 2/2017 | Navda | G06F 3/04842 |
| 2018/0075847 | A1 * | 3/2018 | Lee | G06F 16/3329 |
| 2019/0013017 | A1 * | 1/2019 | Kang | G06N 7/005 |
| 2019/0066677 | A1 * | 2/2019 | Jaygarl | G10L 15/30 |
| 2019/0213509 | A1 * | 7/2019 | Burleson | G06N 20/00 |
| 2019/0370715 | A1 * | 12/2019 | Fikani | G06Q 10/063116 |
| 2020/0410392 | A1 * | 12/2020 | Verma | G06F 9/453 |

* cited by examiner

*Primary Examiner* — Bryan S Blankenagel
(74) *Attorney, Agent, or Firm* — Plumsea Law Group, LLC

(57) ABSTRACT

The present system and method may generally include organizing the task flow of a virtual agent in a way that is controlled by a set of rules and set of conditional probability distributions. The system and method may include receiving a user utterance including a first task, identifying the first task from the user utterance, and obtaining a set of rules related to the plurality of tasks. The set of rules may determine whether pre-tasks and/or pre-conditions are to be executed before executing the first task. The set of rules may also determine whether post-tasks and/or post-conditions are to be executed after executing the first task. The system and method may include executing the task; running a probabilistic graphical model on the plurality of tasks to determine a second task based on the first task; suggesting to the user the second task; and updating the probabilistic graphical model after a threshold number of runs.

20 Claims, 5 Drawing Sheets

ARTIFICIAL INTELLIGENCE BASED SYSTEM AND METHOD FOR CONTROLLING VIRTUAL AGENT TASK FLOW

TECHNICAL FIELD

The present disclosure generally relates to task management of virtual agents. More specifically, the present disclosure generally relates to an artificial intelligence based system and method for controlling task flow.

BACKGROUND

Virtual agents are computer-generated agents that can interact with users. Goal- or task-oriented virtual agents may communicate with human users in a natural language and work with or help the users in performing various tasks. The tasks performed by a virtual agent can vary in type and complexity. Exemplary tasks include information retrieval, rule-based recommendations, as well as navigating and executing complex workflows. Informally, virtual agents may be referred to as "chatbots." Virtual agents may be used by corporations to assist customers with tasks such as booking reservations and working through diagnostic issues (e.g., for solving an issue with a computer). Using virtual agents may offer a corporation advantages by reducing operational costs of running call centers and improving the flexibility with which a company can increase the number of available agents that can assist customers.

Natural language understanding systems help virtual agents identify what the human user desires. For example, the natural language understanding system may have an intent model that finds the user's intent from the user's utterances. Then, a downstream component of the virtual agent, such as a dialog manager, can use the intent to identify how to respond to the human user.

Virtual agents are increasingly used to help the user perform certain tasks quickly and efficiently. Currently dialog systems typically provide a standard approach for designing a new use case regardless of the domain or system goals, which results in the same experience for all users. Because the standard approach is not customized for each domain of virtual agents or for each individual user, the standard approach is often inefficient and time-consuming.

There is a need in the art for a system and method that addresses the shortcomings discussed above.

SUMMARY

A system and method for controlling a virtual agent by organizing task flow is disclosed. The system and method may include receiving a user utterance from a user, the utterance including a first task, identifying the first task from the user utterance, and obtaining a set of rules related to the plurality of tasks. The set of rules may determine whether pre-tasks and/or pre-conditions are to be executed before executing the first task. The set of rules may also determine whether post-tasks and/or post-conditions are to be executed after executing the first task. Using this set of rules can improve the efficiency of how the first task is carried out. The system and method may include executing the task; running a probabilistic graphical model on the plurality of tasks to determine a second task based on the first task; and suggesting to the user the second task based on the probabilistic graphical model. Using the probabilistic graphical model to predict a second task streamlines the task flow by eliminating suggestions for task flows that are unlikely to be desired by the users.

In one aspect, the disclosure provides a computer implemented method of controlling a virtual agent by organizing task flow. The method may include performing a task cycle. The task cycle may include performing the following operations for at least one user: (1) receiving a user utterance from a user, the utterance including a first task; (2) using artificial intelligence to identify the first task from the user utterance (3) obtaining a set of rules related to a plurality of tasks; (4) executing the first task; (5) running a probabilistic graphical model on the plurality of tasks to determine a second task based on the first task; (6) suggesting to the user the second task; and (7) monitoring the user's response to the suggestion of the second task. The plurality of tasks includes at least the first task and the set of rules comprise one or more of the following: (a) mapping context variables from one task to another task within the plurality of tasks; (b) defining one or more tasks of the plurality of tasks as predecessors of one or more of the other tasks of the plurality of tasks; (c) invoking a task of the plurality of tasks based on the value of a context variable; and (d) adding constraints on the plurality of tasks, such that either: (i) one task of the plurality of tasks is mutually exclusive with another task of the plurality of tasks or (ii) one task of the plurality of tasks is compulsory with another task of the plurality of tasks.

In yet another aspect, the disclosure provides a non-transitory computer-readable medium storing software that may comprise instructions executable by one or more computers which, upon such execution, cause the one or more computers to perform a task cycle. The task cycle may include performing the following operations for at least one user: (1) receive a user utterance from a user, the utterance including a first task; (2) use artificial intelligence to identify the first task from the user utterance (3) obtain a set of rules related to a plurality of tasks; (4) executing the first task; (5) run a probabilistic graphical model on the plurality of tasks to determine a second task based on the first task; (6) suggest to the user the second task; and (7) monitor the user's response to the suggestion of the second task. The plurality of tasks includes at least the first task and the set of rules comprise one or more of the following: (a) mapping context variables from one task to another task within the plurality of tasks; (b) defining one or more tasks of the plurality of tasks as predecessors of one or more of the other tasks of the plurality of tasks; (c) invoking a task of the plurality of tasks based on the value of a context variable; and (d) adding constraints on the plurality of tasks, such that either: (i) one task of the plurality of tasks is mutually exclusive with another task of the plurality of tasks or (ii) one task of the plurality of tasks is compulsory with another task of the plurality of tasks.

In yet another aspect, the disclosure provides a system for controlling a virtual agent by organizing task flow, which comprises one or more computers and one or more storage devices storing instructions that may be operable, when executed by the one or more computers, to cause the one or more computers to: to perform a task cycle. The task cycle may include performing the following operations for at least one user: (1) receive a user utterance from a user, the utterance including a first task; (2) use artificial intelligence to identify the first task from the user utterance (3) obtain a set of rules related to a plurality of tasks; (4) executing the first task; (5) run a probabilistic graphical model on the plurality of tasks to determine a second task based on the first task; (6) suggest to the user the second task; and (7)

monitor the user's response to the suggestion of the second task. The plurality of tasks includes at least the first task and the set of rules comprise one or more of the following: (a) mapping context variables from one task to another task within the plurality of tasks; (b) defining one or more tasks of the plurality of tasks as predecessors of one or more of the other tasks of the plurality of tasks; (c) invoking a task of the plurality of tasks based on the value of a context variable; and (d) adding constraints on the plurality of tasks, such that either: (i) one task of the plurality of tasks is mutually exclusive with another task of the plurality of tasks or (ii) one task of the plurality of tasks is compulsory with another task of the plurality of tasks.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
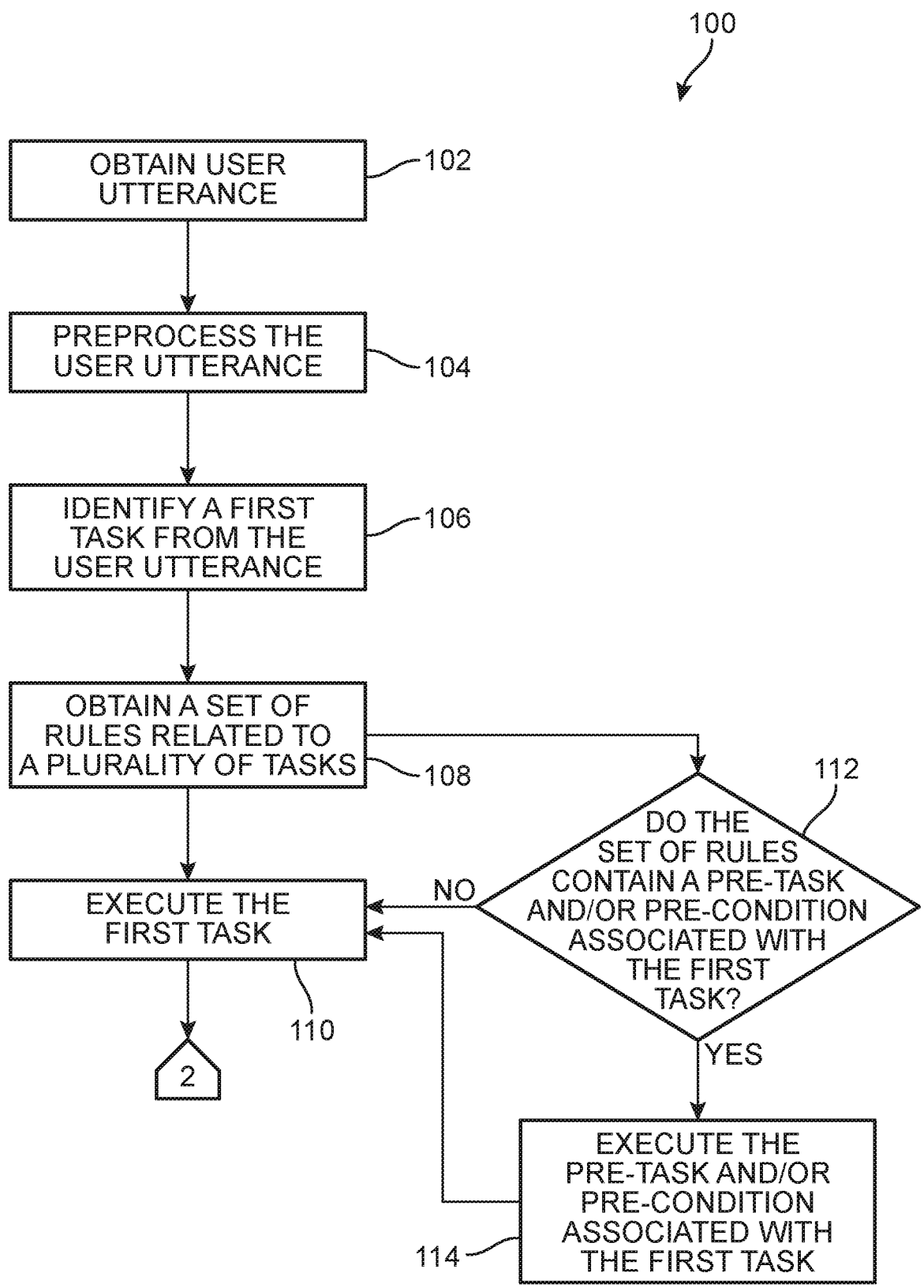
FIGS. 1 and 2 show a computer implemented method of controlling a virtual agent by organizing task flow according to an embodiment.

The present system and method may generally include organizing the task flow of a virtual agent in a way that is controlled by a set of rules and set of conditional probability distributions (CPDs). For example, if a virtual agent performs within the domain of booking restaurant and travel reservations, the virtual agent may be controlled by a set of rules that define a default task flow that is initiated in response to identifying that a user has requested that the virtual agent perform the task of making a flight reservation. This exemplary default task flow may include a pre-condition, such as asking a user about which airline the user prefers, the destination/arrival times, or the airport locations. In another example, the pre-condition may be a value provided by the user in an earlier task. Additionally or alternatively, this exemplary default task flow may include a pre-task, such as looking up flights meeting the user's criteria (e.g., destination/arrival times and/or airport locations) or greeting a user. The pre-condition and pre-task may be defined by the set of rules. The exemplary default task flow may include a post-task, such confirming with the user that the flight was booked. The exemplary default task flow may include a second task, such as asking the user about booking a hotel reservation and a rental car, after the task of booking the flight reservation is complete. This second task may be based on the results of running a probabilistic graphical model (e.g., Bayesian network). In other words, this disclosure provides machine learning of tasks that may take place by modelling task dependencies as a probabilistic graphical model (e.g., Bayesian network), learning the probabilities via a maximum likelihood estimator, and using a threshold mechanism to make predictions.

The present system and method may further include organizing the task flow of a virtual agent in a way that is customized for one or both of a particular domain and an individual user. Going back to the previous example, assume the user's name is Bob. In accordance with the default task flow, which is based in part of the results of running a probabilistic graphical model, the virtual agent asks Bob about booking a hotel reservation and a rental car after the task of booking the flight reservation is complete. The virtual agent of the present system and method can monitor how Bob responds to the virtual agent's questions and what Bob requests of the virtual agent after booking the flight reservation. After Bob has used the virtual agent to book a flight a threshold number of times, e.g., five times, the probability graphical model may be updated based on the CPDs reflecting Bob's chosen task flow from the first task to the subsequent tasks Bob selects for execution by the virtual agent. For example, in this situation, if Bob has booked flight reservations five times and he has declined the virtual agent's offer to make a hotel reservation and has accepted the virtual agent's offer to make a rental car reservation all five times, the virtual agent may make a custom task flow for Bob that is initiated when Bob requests that the virtual agent makes a flight reservation a sixth time. Machine learning may be utilized to determine a task flow for Bob. For example, this custom task flow can be based on running a probabilistic graphical model using a maximum likelihood estimator on Bob's history. This custom task flow can be an adjusted version of the default task flow. For example, the custom task flow can eliminate the question about hotel reservations and can ask if Bob wants to make a rental car reservation immediately after completing Bob's flight reservation. As a result of this customization of the default task flow, the virtual agent can complete tasks for Bob when Bob asks the virtual agent to make a flight reservation in a more streamlined, efficient manner. Also, by dropping the question about the hotel reservation, the customized task flow can ease Bob's stress while making flight reservations.

In some embodiments, the virtual agent may monitor many users interactions with the virtual agent. In such embodiments, after a threshold number of runs by multiple users, the probability graphical model may be updated based on the probabilities reflecting the sequence of tasks selected by the multiple users. Staying with the above example of a default task flow having the general order of 1) obtain request for flight reservation, 2) make flight reservation, 3) ask about hotel reservation, and 4) ask about car rental reservation, if 10 other users in addition to Bob decline the offer to have the virtual agent make a hotel reservation over the course of 20 task cycles, updating the probabilistic graphical model may include adjusting the default task flow for all users to skip the question about the hotel reservation.

In some embodiments, the disclosed system may be a virtual agent or one or more subsystems of a virtual agent. In some embodiments, the disclosed method may be a computer implemented method performed by a virtual agent or one or more subsystems of a virtual agent.

Figure 2:
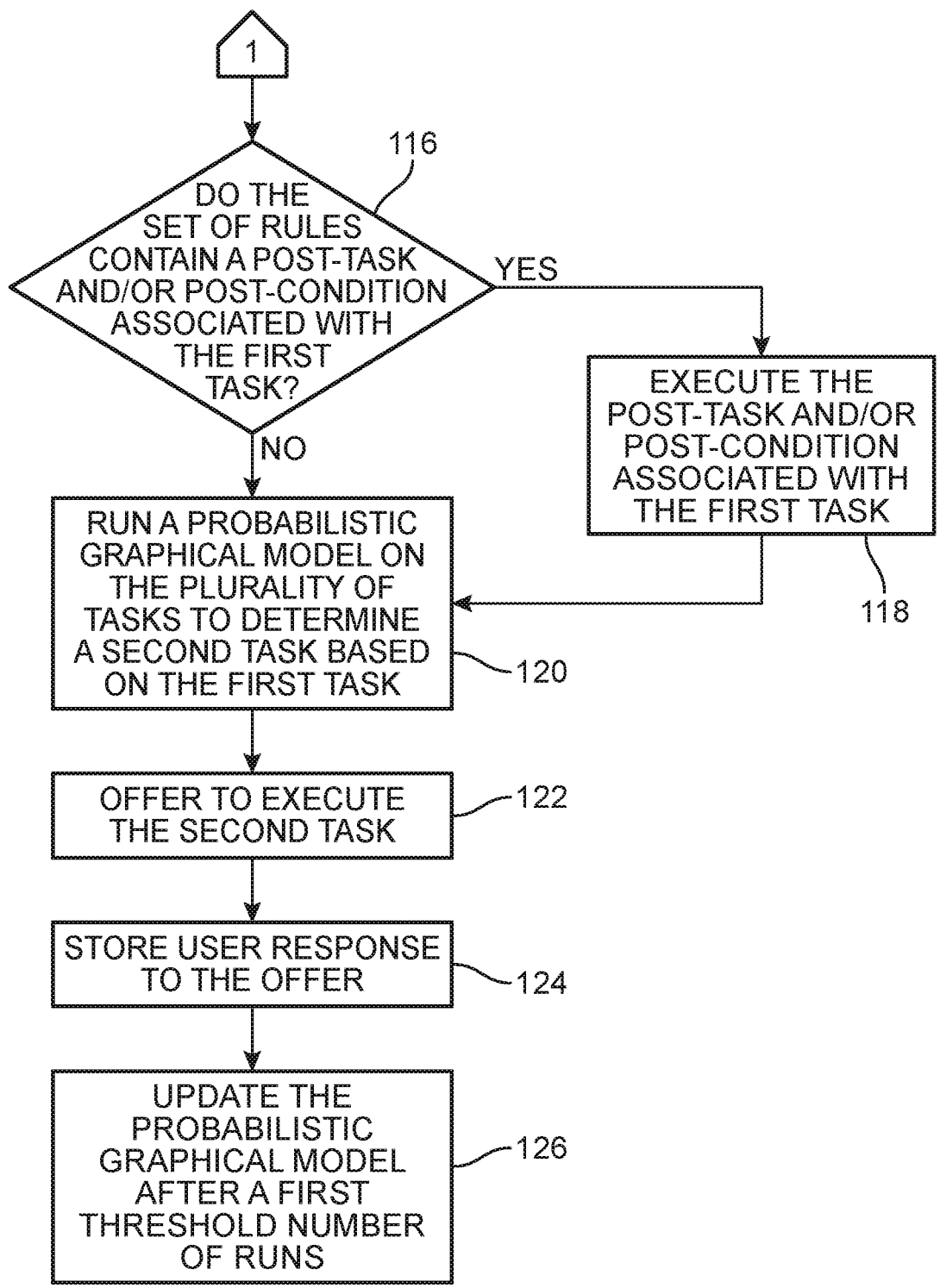

To help discuss the disclosed system and method in more detail, FIGS. 1 and 2 show a computer implemented method of controlling a virtual agent by organizing task flow 100 (or method 100) according to an embodiment. In some embodiments, the present system and method may include obtaining a user utterance, preprocessing the utterance to put it in better form for processing, and processing the utterance to identify the user's intent. For example, method 100 includes obtaining a user utterance (operation 102), preprocessing the user utterance (operation 104), and identifying a first task from the user utterance (operation 106). In some embodiments, preprocessing may include, for example, language detection, profanity detection, spell checking, and/or emotion detection. In some embodiments, identifying the user's intent may include, for example, using natural language understanding to identify intent, identify dialog act classification, and/or perform slot filling for the utterance. In some embodiments, using natural language understanding may include using artificial intelligence, such as, for example, machine learning and/or regular expressions to identify a task from the user utterance.

In some embodiments, the present system and method may include obtaining a set of rules related to a plurality of tasks. For example, method 100 includes obtaining a set of rules related to a plurality of tasks (operation 108). In some embodiments, the set of rules may define a general template that may be configured for various domain-specific languages, thus providing domain-specific rules.

In some embodiments, the set of rules may include mapping context variables from one task to another task within the plurality of tasks. For example, this type of mapping may be described as "var1=var2", meaning that a first variable (e.g., a hotel destination) is equal to a second variable (e.g., a flight destination). Other nonlimiting examples of context variables may include flight destination time/date, flight arrival time/date, hotel location, restaurant location, restaurant cuisine type, meeting time/date, meeting location, hotel chain, car rental chain, and airline.

The set of rules may additionally or alternatively include defining one or more tasks of the plurality of tasks as predecessors of one or more of the other tasks of the plurality of tasks. In other words, the set of rules may define a hierarchy of tasks. For example, a relationship between two tasks may be defined as "Task1<Task2." In this example, Task 1 (e.g., greeting a user) must be performed before Task 2 (e.g., booking a flight).

The set of rules may additionally or alternatively include invoking a task of the plurality of tasks based on the value of a context variable. For example, a value of a context variable and a task dependent on the same value may be described as "var1==X, next_task=Task5." In a specific example, if the value of a meeting destination is the same as the user's current location, then the next task is to book a taxi. This more specific example may be expressed as "if (meeting_task.dest=meeting_task.current_location), next_task=taxi_task."

The set of rules may additionally or alternatively include adding constraints on the plurality of tasks, such that either: (1) one task of the plurality of tasks is mutually exclusive with another task of the plurality of tasks or (2) one task of the plurality of tasks is compulsory with another task of the plurality of tasks. For example, "Task1 OR Task2" can mean that Task1 and Task2 are mutually exclusive. In other words, either Task1 or Task 2 must be performed. In one example of mutually exclusive tasks, either booking a taxi or booking a flight must be performed, but both are not to be performed. In another example, Task1 AND Task2 can mean that Task2 is compulsory when Task1 is selected and Task1 is compulsory when Task2 is selected. In other words, Task1 is compulsory with Task2 and both Task 1 and Task 2 must be performed. In one example of compulsory tasks, a flight task must be performed when a hotel task is performed, and a hotel task much be performed when a flight task is performed.

In some embodiments, the present system and method may include determining whether the set of rules contain a pre-task and/or a pre-condition associated with the first task. For example, method 100 includes determining whether the set of rules contain a pre-task and/or a pre-condition associated with the first task (operation 112).

In some embodiments, the present system and method may include executing the pre-task and/or pre-condition associated with the first task if it is determined that the set of rules contain the pre-task and/or pre-condition. For example, method 100 includes executing the pre-task and/or pre-condition associated with the first task if the set of rules contain the pre-task and/or pre-condition (operation 114).

In some embodiments, the present system and method may include executing the first task either after determining that no pre-task and/or pre-condition exists within the rules or after executing the pre-task and/or pre-condition if it has been determined that a pre-task and/or pre-condition exists within the set of rules. For example, method 100 includes executing the first task (operation 110).

In some embodiments, the present system and method may include determining whether the set of rules contain a post-task and/or a post-condition associated with the first task. For example, method 100 includes determining whether the set of rules contain a post-task and/or a post-condition associated with the first task (operation 116).

In some embodiments, the present system and method may include executing the post-task and/or post-condition associated with the first task if it is determined that the set of rules contain the post-task and/or post-condition. For example, method 100 includes executing the post-task and/or post-condition associated with the first task if the set of rules contain the post-task and/or post-condition (operation 118).

In some embodiments, the present system and method may include utilizing machine learning to determine a task flow for one or more users. For example, the present system and method may include running a probabilistic model on the plurality of tasks to determine a second task from the plurality of tasks based on the first task. For example, method 100 includes running a probabilistic model on the plurality of tasks to determine a second task based on the first task (operation 120). This operation may be performed after either executing the post-task and/or post condition associated with the first task or determining that no such post-task and/or post condition exists within the set of rules.

Figure 3:
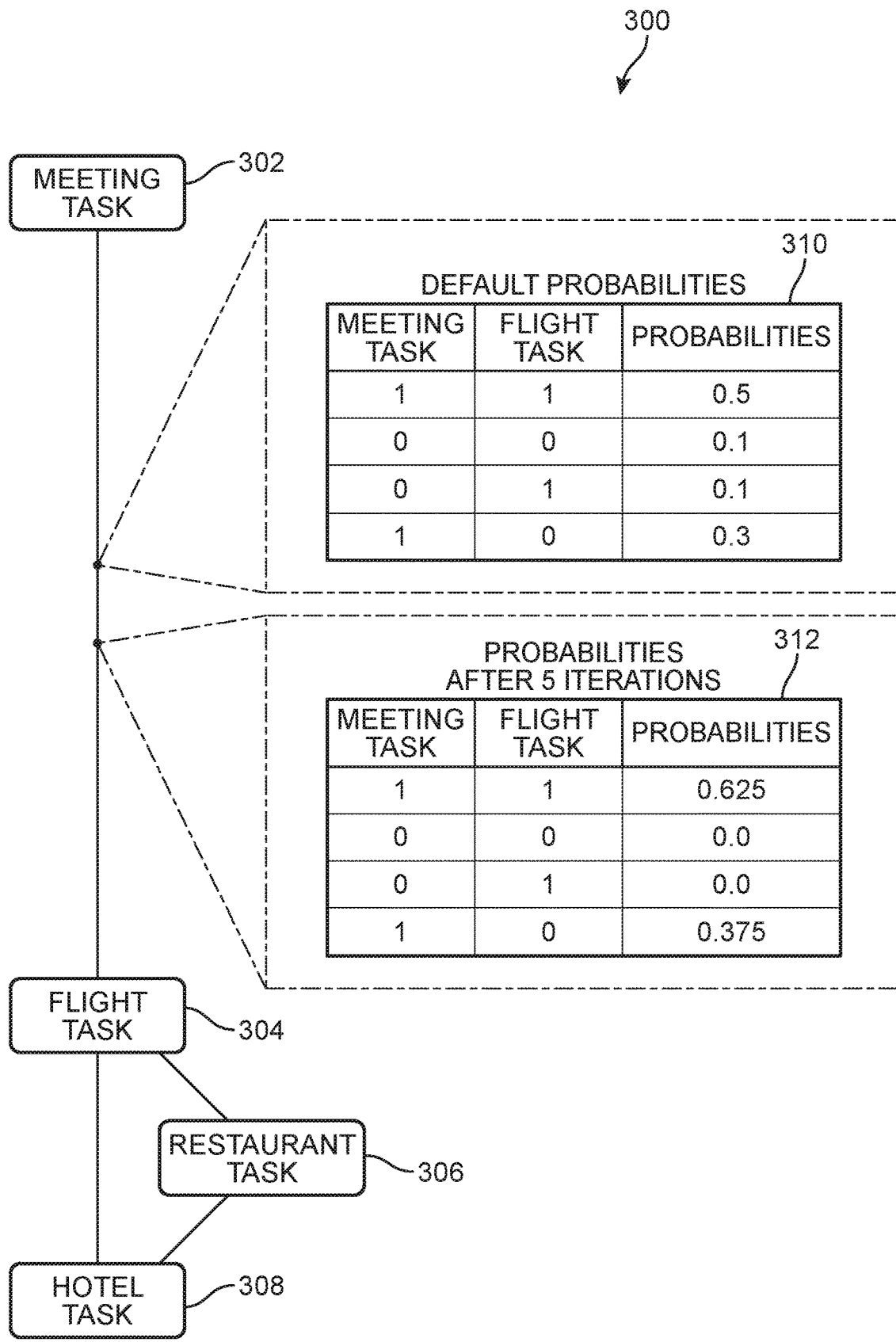
FIG. 3 shows a schematic diagram of a task network including a meeting task, a flight task, a restaurant task, and a hotel task all connected to one another.

In some embodiments, the present system and method may include suggesting a second task by offering to execute the second task based on the probabilistic graphical model. For example, method 100 includes offering to execute the second task (operation 122). In some embodiments, the probabilistic graphical model may be a Bayesian network. FIG. 3 shows a schematic diagram of a task network 300 including a meeting task 302, a flight task 304, a restaurant task 306, and a hotel task 308 all connected to one another. As discussed in more detail below, in some embodiments, this task network may reside in a task handler. In some embodiments, a table of probabilities between tasks may be stored in a table in a database. For example, table of default probabilities 310 (or table 310) shows probabilities related to a meeting task and a flight task. These probabilities are a set of CPDs. In some embodiments, the default probabilities may be set as a general starting point, since the probabilities will be adjusted over time based on how users actually order the tasks in use. The default probabilities may be selected based on a variety of factors. For example, in one embodiment, the default probabilities may be selected based on an assumption about user preferences or based on a logical order of tasks. In yet another embodiment, the default probabilities may be selected based on the results of a survey of users' preferences.

Table 310 shows that the probability of having a flight task when there is a meeting task is 0.5; the probability of having no meeting task when there is no flight task is 0.1; the probability of not having a meeting task when there is a flight task is 0.1; and the probability of having a meeting task when there is no flight task is 0.3. If the probability listed for two tasks is equal to or more than a second threshold (e.g., 0.5, 0.55, or 0.6), this probability may indicate that a user wants the virtual agent to execute a particular task after the first task. Accordingly, that particular task may be selected as the second task that is offered to the user. In the example shown in FIG. 3, when the first task is meeting task 302, the second task based on a probabilistic graphical model is the flight task if the second threshold is 0.5 because the probability that a flight task is associated with a meeting task being selected is 0.5 in table 310.

It is understood that a run, or task cycle, in the context of this disclosure can include performing the operations of the method related to identifying that a user is requesting a first task, executing the first task, running a probabilistic graphical model on the plurality of tasks to determine a second task, offering to execute the second task, and any subsequent tasks. For example, in method 100, a task cycle may include performing operations 102, 104, 106, 108, 110, 112, 114, 116, 118, 120, and 122. In some embodiments, the present system and method may include storing one or more responses to the offer to execute a second task (which may include responses by one or more users) in a database. For example, method 100 includes storing user response to the offer to execute a second task (operation 124). By storing one or more responses by one or more users, the responses may be used to update the probabilistic graphical model using a maximum likelihood indicator for future runs. In this way, as explained below, the sequence of tasks in a task cycle may be customized for an individual user and/or for all users. For example, if the majority of users decline the offer to perform the second task and instead request a different task (or third task) after the first task is executed, then updating the probabilistic graphical model may reflect a higher probability between the first task and the third task.

In some embodiments, the present system and method may include updating the probabilistic graphical model using a maximum likelihood indicator after a first threshold number of runs. For example, method 100 includes updating the probabilistic graphical model using a maximum likelihood indicator after a first threshold number of runs (operation 126). This update may reflect a user's preference and/or a plurality of users' preferences. For example, if the first threshold number of runs is five, and a particular user accepts the offer to execute the second task three or more times out of five runs in which the first task is requested, then the probabilistic graphical model is updated based on these results, which reflect that the user's preference is to be offered the second task. However, in the same example, if the user declines the offer to execute the second task three or more times out of five runs, then the probabilistic graphical model is updated based on these results, which reflect that the user's preference is to not be offered the second task. In such a case, the probabilistic graphical model may also be updated to reflect that a user prefers a different task in place of the second task, if the user has routinely requested or selected a different task in place of the second task after being offered the second task for execution.

In another example, if the threshold number of runs is 20, and a plurality of users (e.g., all users or users within a specific domain) accept the offer to execute the second task 16 times out of 20 runs, then the probabilistic graphical model is updated based on these results, which reflect that the plurality of users (e.g., all users or users within a specific domain) mostly prefers to be offered the second task. However, in the same example, if the plurality of users (e.g., all users or users within a specific domain) declines the offer to execute the second task 16 times out of 20 runs, then the probabilistic graphical model is updated based on these results, which reflect that the plurality of users (e.g., all users or users within a specific domain) mostly prefers to not be offered the second task. In such a case, the probabilistic graphical model may also be updated to reflect that plurality of users (e.g., all users or users within a specific domain) prefer a different task in place of the second task, if the plurality of users (e.g., all users or users within a specific domain) have routinely requested or selected a different task in place of the second task after being offered the second task for execution.

In some embodiments, the probabilistic graphical model may be updated based on individual users such that each individual user may be associated with a unique sequence of tasks. In some embodiments, in addition to or instead of individual task flows, the probabilistic graphical model may be updated based on multiple users. For example, in some embodiments, after a first threshold number of runs associated with a first user, the probabilistic graphical model may be updated for only the first user. And in the same example, after a second threshold number of runs associated with a plurality of users (e.g., all users or users within a specific domain), the probabilistic graphical model may be updated for a plurality of users (e.g., all users or users of a specific domain). The first threshold number of runs and the second threshold number of runs may be selected based on a variety of factors. For example, the first threshold number of runs and the second threshold number of runs may be selected based on how many runs indicates a user's preference and/or how many runs indicate a plurality of users' preferences. In some embodiments, the first threshold number of runs in this example may be the same or different from the second threshold number of runs. In some embodiments, the first threshold number of runs may be a lower number than the second threshold number of runs. In some embodiments, the first threshold number may be the same or more than the second threshold number of runs.

FIG. 3 shows an example of updating a probabilistic graphical model. In FIG. 3, a table of probabilities after five iterations (or runs) 312, which shows probabilities related to a meeting task and a flight task after five runs with the same user. This table shows that the probability of having a flight task when there is a meeting task is 0.625; the probability of having no meeting task when there is no flight task is 0.0; the probability of not having a meeting task when there is a flight task is 0.0; and the probability of having a meeting task when there is no flight task is 0.375.

In addition to monitoring and storing user history of task cycles and the selections or requests users make during task cycles, which can indicate user preferences, the disclosed system and method may include using a social network structure between users to make recommendations. For example, users may be connected to one another by an interaction with one another, by physical proximity to one another, by working for a common employer, and/or by being related. In this way, the disclosed system and method can use this information to make predictions about task selection. For example, if a user utterance says that she would like to have dinner with her friend "Donna," who is a known user in the system, a stored set of context variables related to each of the user and Donna can help predict a location for a restaurant near both the user and Donna when executing tasks related to making a dinner reservation.

Figure 4:
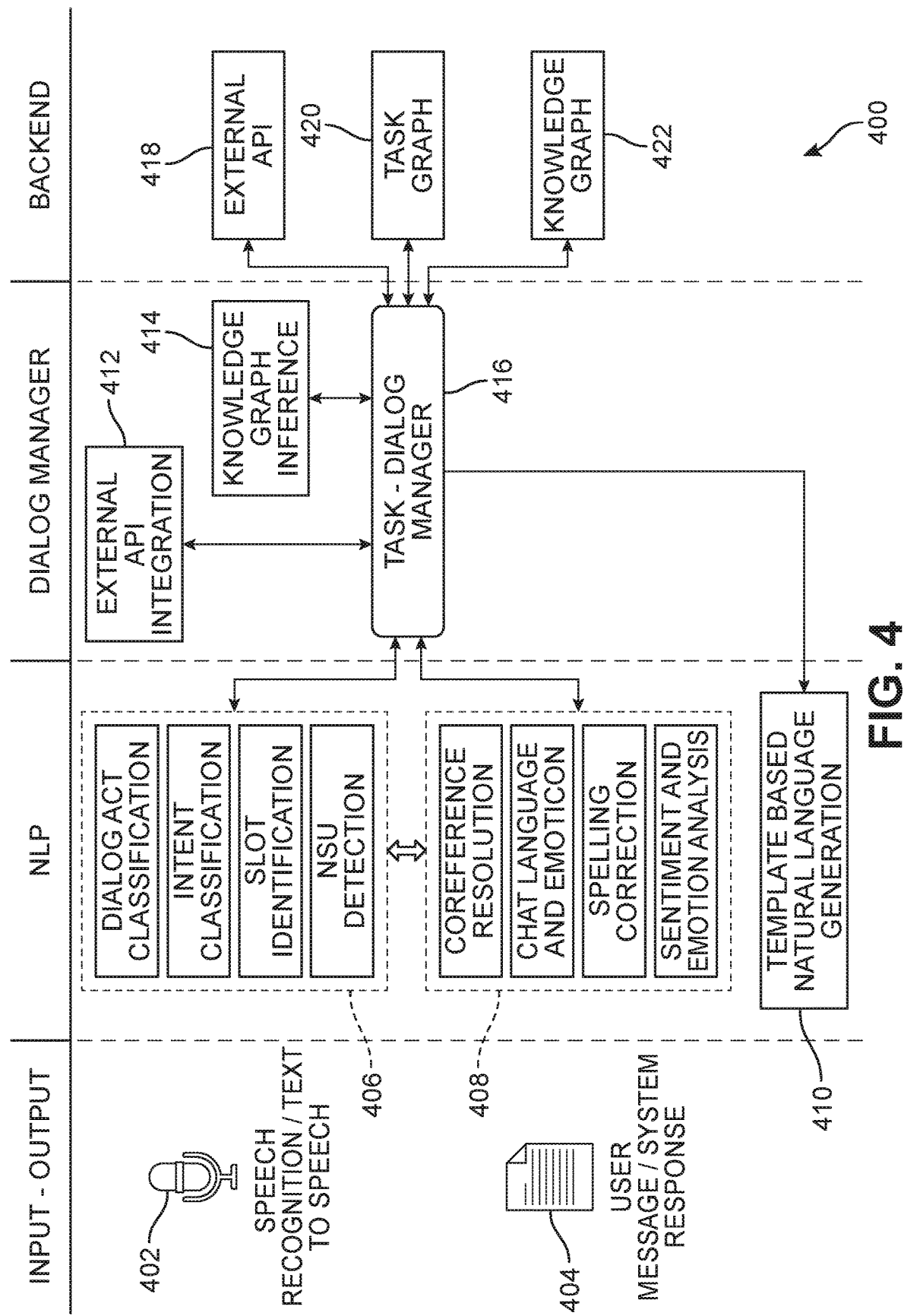
FIG. 4 shows a schematic diagram of a dialog manager implementation into a virtual agent according to an embodiment.

FIG. 4 shows a schematic diagram of a dialog manager implementation into a virtual agent 400 according to an embodiment. The dialog manager implementation may include a mechanism for receiving inputs and displaying outputs to a user. For example, this mechanism may include speech recognition for inputting audio speech from a user and a text-to-speech capability 402 for providing the user with a speech output. The dialog manager implementation may include a user message/system response 404 for inputting text from a user and providing output to a user in text.

The dialog manager implementation may include natural language processor (NLP) including core natural language understanding (NLU) services 406 and additional NLU services 408. For example, core NLU services may include dialog act classification, intent classification, slot identification, and nonsentential utterances (NSU). In another example, additional NLU services may include coreference resolution, chat language and emoticon, spelling correction, and sentiment and emotion analysis. The NLP may further include a template-based natural language generation 410.

The dialog manager implementation may include a dialog manager 416 that manages interactions with a user. The dialog manager including a task-dialog manager, an external application programming interface (API) 412, and a knowledge graph inference 414. Each of these elements may communicate with one another. Additionally, the task dialog manager may be in communication with all of the elements within the NLP.

The dialog manager implementation may include a back-end including an external API 418, a task graph 420, and a knowledge graph 422. These elements may each communicate with the task dialog manager.

Figure 5:
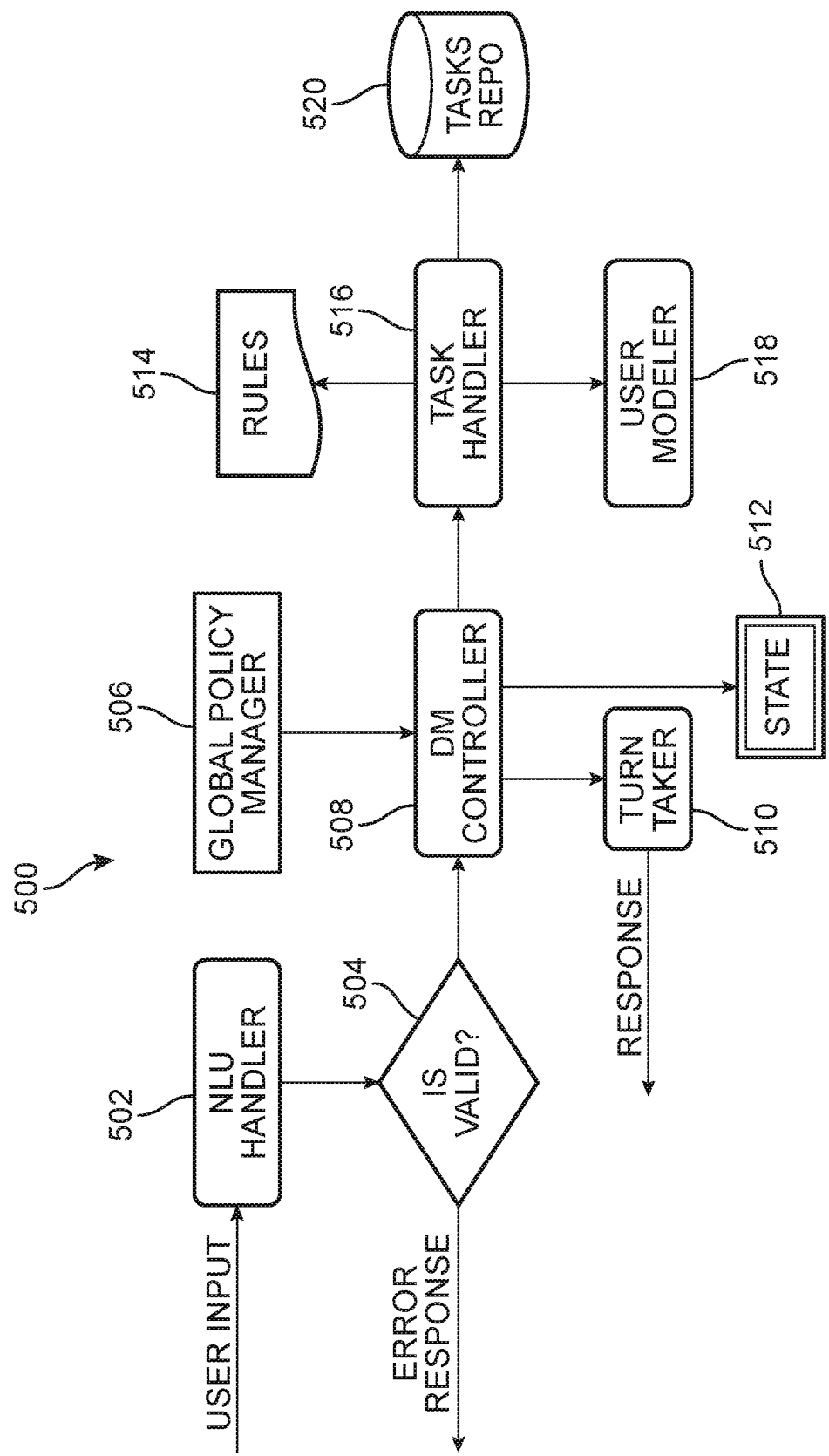
FIG. 5 shows a schematic diagram of a dialog system according to an embodiment.

FIG. 5 shows a schematic diagram of a dialog system 500 according to an embodiment. The dialog system may include an NLU handler 502, a dialog manager (DM) controller 508, a global policy manager 506, a state holder 512, a turn taker 510, a task handler 516, a task repository 520, a user modeler 518, and rules 514.

NLU Handler: This component interfaces with the intent, dialog act handler, and entity code. User input first enters the system through the NLU handler. It also determines the validity of the sentence, e.g., language and profanity detection, at 504, which may provide an error response.

DM Controller: This component handles the coordination between the various components based on the prevailing state.

Global Policy Manager and Rules: These components control the flow of the dialog and tasks via a configurable policy and a set of rules.

State holder: This component holds the details of the NLU as well as the intermediate context variables related to the task. In other words, this component keeps track of tasks that must be performed and then removes tasks as they are performed.

Turn Taker: This component helps run the system-initiated dialog by Tracking when the dialog system needs to respond to user. In other words, the turn taker determines whose turn it is to speak. The turn taker's output is a response to the user.

Task Handler: This component maps (or matches) the intent to a task or set of tasks. Also, this component runs the required rules and a Bayesian prediction algorithm Task Repository: This component contains a list of tasks with corresponding hierarchies.

User Modeler: This component contains the Bayesian network for the tasks and probabilities. For example, in some embodiments, this component may contain graphs of tasks.

Dialog management governance is through policies. The polices are managed through a policy file, which may include one or more of the following: a slot-filling policy, an intent matching policy, an error handling, and a grounding policy.

Slot-Filling Policy: Aggressive versus simple—ask all slots or some slots. In other words, the system asks for all slots or variables relevant to the dialog in one go or one by one.

Intent matching Policy: best versus first means that when running the external intent matching algorithms, the best policy runs all the algorithms and pick the one with the maximum confidence score and the first policy runs the algorithms until a high enough confidence score is found.

Error handling: number of error retries, i.e., the number of times the dialog system asks the customer to re-enter the input.

Grounding policy: score for definite match versus user clarification needed versus no match, i.e., if a confidence threshold above (0.8) is not found but the system finds several alternatives between (0.6 and 0.8) then the system will seek a clarification before processing the query. Similarly, the grounding policy may also be used to handle unknown foreign language comments or profanity.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer implemented method of controlling a virtual agent by organizing task flow, comprising:
   performing a task cycle, wherein the task cycle includes performing the following operations for at least one user:
   receiving a user utterance from a user, the user utterance including a first task;
   using artificial intelligence to identify the first task from the user utterance;
   obtaining a set of rules related to a plurality of tasks, wherein the plurality of tasks includes at least the first task and the set of rules comprise the following:
   mapping context variables from one task to another task within the plurality of tasks, wherein the context variables include values corresponding to the tasks and/or to characteristics of the tasks and wherein the values indicate relationships between the tasks and/or the characteristics of the tasks;
   defining one or more tasks of the plurality of tasks as predecessors of one or more of the other tasks of the plurality of tasks;
   invoking a task of the plurality of tasks based on the value of a context variable; and
   adding constraints on the plurality of tasks, such that either: (1) one task of the plurality of tasks is mutually exclusive with another task of the plurality of tasks or (2) one task of the plurality of tasks is compulsory with another task of the plurality of tasks;
   executing the first task;
   applying the set of rules to the plurality of tasks;
   running a probabilistic graphical model on the plurality of tasks to determine, for each combination of the first task and another task of the plurality of tasks, a probability that the task cycle includes both the first task and the other task;
   determining a second task based on both the application of the set of rules and the probability of being included in the task cycle with the first task;
   recommending to the user the second task; and
   monitoring the user's response to the recommendation of the second task.

2. The computer implemented method of claim 1, further comprising:
   in response to performing a threshold number of task cycles for a single user, updating the probabilistic graphical model using a maximum likelihood estimator based on the user's responses to the recommendation of the second task during the task cycles of the threshold number of task cycles.

3. The computer implemented method of claim 1, further comprising determining that the second task is the task having the highest probability of being included in the task cycle with the first task.

4. The computer implemented method of claim 1, further comprising determining that the second task is the task having a probability of being included in the task cycle with the first task that is above a threshold probability value and wherein the characteristics of the tasks include a location, a destination, and/or a time.

5. The computer implemented method of claim 1, further comprising:
   in response to performing a threshold number of task cycles performed for multiple users, updating the probabilistic graphical model a using maximum likelihood estimator based on the multiple users' responses to the recommendation of the second task during the task cycles of the first threshold number of task cycles.

6. The computer implemented method of claim 1, further comprising:
   checking the rules for a pre-task and/or pre-condition associated with the first task; and
   executing the pre-task and/or meeting the pre-condition prior to executing the first task.

7. The computer implemented method of claim 1, further comprising:
   checking the rules for a post-task and/or post-condition associated with the first task; and
   executing the post-task and/or meeting the post-condition after executing the first task.

8. A non-transitory computer-readable medium storing software comprising instructions executable by one or more computers which, upon such execution, cause the one or more computers to:
   perform a task cycle, wherein the task cycle includes performing the following operations for at least one user:
   receive a user utterance from a user, the user utterance including a first task;
   use artificial intelligence to identify the first task from the user utterance;
   obtain a set of rules related to a plurality of tasks, wherein the plurality of tasks includes at least the first task and the set of rules comprise one or more of the following:
   map context variables from one task to another task within the plurality of tasks, wherein the context variables include values corresponding to the tasks and/or to characteristics of the tasks and wherein the values indicate relationships between the tasks and/or the characteristics of the tasks;
   defining one or more tasks of the plurality of tasks as predecessors of one or more of the other tasks of the plurality of tasks;
   invoking a task of the plurality of tasks based on the value of a context variable; and
   adding constraints on the plurality of tasks, such that either: (1) one task of the plurality of tasks is mutually exclusive with another task of the plurality of tasks or (2) one task of the plurality of tasks is compulsory with another task of the plurality of tasks; and
   execute the first task;
   apply the set of rules to the plurality of tasks;
   run a probabilistic graphical model on the plurality of tasks to determine, for each combination of the first task and another task of the plurality of tasks, a probability that the task cycle includes both the first task and the other task;
   determine a second task based on both the application of the set of rules and the probability of being included in the task cycle with the first task;
   recommend to the user the second task; and
   monitor the user's response to the recommendation of the second task.

9. The non-transitory computer-readable medium storing software of claim 8, wherein the instructions, upon execution, further cause the one or more computers to:

in response to performing a threshold number of task cycles for a single user, update the probabilistic graphical model using a maximum likelihood estimator based on the user's responses to the recommendation of the second task during the task cycles of the threshold number of task cycles.

10. The non-transitory computer-readable medium storing software of claim 8, further comprising determining that the second task is the task having the highest probability of being included in the task cycle with the first task.

11. The non-transitory computer-readable medium storing software of claim 8, further comprising determining that the second task is the task having a probability of being included in the task cycle with the first task that is above a threshold probability value and wherein the characteristics of the tasks include a location, a destination, and/or a time.

12. The non-transitory computer-readable medium storing software of claim 8, wherein the instructions, upon execution, further cause the one or more computers to:
 in response to performing a threshold number of task cycles performed for multiple users, updating the probabilistic graphical model using a maximum likelihood estimator based on the multiple users' responses to the recommendation of the second task during the task cycles of the first threshold number of task cycles.

13. The non-transitory computer-readable medium storing software of claim 8, wherein the instructions, upon execution, further cause the one or more computers to:
 check the rules for a pre-task and/or pre-condition associated with the first task; and
 execute the pre-task and/or meeting the pre-condition prior to executing the first task.

14. The non-transitory computer-readable medium storing software of claim 8, wherein the instructions, upon execution, further cause the one or more computers to:
 check the rules for a post-task and/or post-condition associated with the first task; and
 execute the post-task and/or meeting the post-condition after executing the first task.

15. A system for controlling a virtual agent by organizing a task flow, comprising:
 one or more computers and one or more storage devices storing instructions that are operable, when executed by the one or more computers, to cause the one or more computers to:
 perform a task cycle, wherein the task cycle includes performing the following operations for at least one user:
 receive a user utterance from a user, the user utterance including a first task;
 use artificial intelligence to identify the first task from the user utterance;
 obtain a set of rules related to a plurality of tasks, wherein the plurality of tasks includes at least the first task and the set of rules comprise one or more of the following:
 map context variables from one task to another task within the plurality of tasks, wherein the context variables include values corresponding to the tasks and/or to characteristics of the tasks and wherein the values indicate relationships between the tasks and/or the characteristics of the tasks;
 defining one or more tasks of the plurality of tasks as predecessors of one or more of the other tasks of the plurality of tasks;
 invoking a task of the plurality of tasks based on the value of a context variable; and
 adding constraints on the plurality of tasks, such that either: (1) one task of the plurality of tasks is mutually exclusive with another task of the plurality of tasks or (2) one task of the plurality of tasks is compulsory with another task of the plurality of tasks; and
 execute the first task;
 apply the set of rules to the plurality of tasks;
 run a probabilistic graphical model on the plurality of tasks to determine, for each combination of the first task and another task of the plurality of tasks, a probability that the task cycle includes both the first task and the other task;
 determine a second task based on both the application of the set of rules and the probability of being included in the task cycle with the first task;
 recommend to the user the second task; and
 monitor the user's response to the recommendation of the second task.

16. The system of claim 15, wherein the stored instructions are further operable, when executed by the one or more computers, to cause the one or more computers to:
 in response to performing a threshold number of task cycles for a single user, updating the probabilistic graphical model using a maximum likelihood estimator based on the user's responses to the recommendation of the second task during the task cycles of the threshold number of task cycles.

17. The system of claim 15, further comprising determining that the second task is the task having the highest probability of being included in the task cycle with the first task.

18. The system of claim 15, further comprising determining that the second task is the task having a probability of being included in the task cycle with the first task that is above a threshold probability value and wherein the characteristics of the tasks include a location, a destination, and/or a time.

19. The system of claim 15, wherein the stored instructions are further operable, when executed by the one or more computers, to cause the one or more computers to:
 in response to performing a threshold number of task cycles performed for multiple users, updating the probabilistic graphical model a using maximum likelihood estimator based on the multiple users' responses to the recommendation of the second task during the task cycles of the threshold number of task cycles.

20. The system of claim 15, wherein the stored instructions are further operable, when executed by the one or more computers, to cause the one or more computers to:
 check the rules for a pre-task and/or pre-condition associated with the first task;
 execute the pre-task and/or meeting the pre-condition prior to executing the first task;
 check the rules for a post-task and/or post-condition associated with the first task; and
 execute the post-task and/or meeting the post-condition after executing the first task.

\* \* \* \* \*